(12) United States Patent
Chun et al.

(10) Patent No.: US 8,958,378 B2
(45) Date of Patent: Feb. 17, 2015

(54) MULTICARRIER BASED COMMUNICATION METHOD AND DEVICE

(75) Inventors: Jin Young Chun, Anyang-si (KR); Jin Sam Kwak, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 13/581,605

(22) PCT Filed: Mar. 2, 2011

(86) PCT No.: PCT/KR2011/001443
§ 371 (c)(1),
(2), (4) Date: Aug. 28, 2012

(87) PCT Pub. No.: WO2011/108846
PCT Pub. Date: Sep. 9, 2011

(65) Prior Publication Data
US 2012/0320860 A1    Dec. 20, 2012

Related U.S. Application Data

(60) Provisional application No. 61/309,431, filed on Mar. 2, 2010.

(51) Int. Cl.
| | | |
|---|---|---|
| H04W 72/00 | (2009.01) | |
| H04L 5/00 | (2006.01) | |
| H04L 27/26 | (2006.01) | |
| H04W 48/16 | (2009.01) | |
| H04W 72/04 | (2009.01) | |

(52) U.S. Cl.
CPC ............... *H04L 5/003* (2013.01); *H04L 27/26* (2013.01); *H04L 5/0007* (2013.01); *H04W 48/16* (2013.01); *H04W 72/0453* (2013.01); *H04W 72/04* (2013.01)
USPC ........... 370/329; 370/343; 370/352; 370/267; 370/260

(58) Field of Classification Search
None
See application file for complete search history.

(56) References Cited

U.S. PATENT DOCUMENTS

| | | | |
|---|---|---|---|
| 2009/0185632 A1 | 7/2009 | Cai et al. | |
| 2009/0201877 A1 | 8/2009 | Noh et al. | |
| 2010/0002675 A1* | 1/2010 | Fu et al. | ........................ 370/343 |
| 2010/0002796 A1* | 1/2010 | Zhang et al. | ................... 375/267 |
| 2010/0278123 A1* | 11/2010 | Fong et al. | ..................... 370/329 |
| 2012/0002575 A1* | 1/2012 | Noh et al. | ..................... 370/280 |

* cited by examiner

*Primary Examiner* — Marcus R Smith
*Assistant Examiner* — Ayanah George
(74) *Attorney, Agent, or Firm* — McKenna Long & Aldridge, LLP (57) ABSTRACT

Provided are a multicarrier based communication method and device. A mobile station activates a first carrier, and activates a second carrier adjacent to the first carrier. Defined within the first carrier there is a first frame comprising a legacy UL (uplink) region and an AAI (Advanced Air Interface) UL region; defined within the second carrier there is a second frame comprising an AAI UL region in the first frame occupy frequencies that differ from each other; and guard subcarriers between the AAI UL region of the first frame and the AAI UL region of the second frame are not used for data transmission.

10 Claims, 10 Drawing Sheets

MULTICARRIER BASED COMMUNICATION METHOD AND DEVICE

This Application is a 35 U.S.C. §371 National Stage Entry of International Application No. PCT/KR2011/001443, filed Mar. 2, 2011 and claims the benefit of U.S. Provisional Application No. 61/309,431, filed Mar. 2, 2010, all of which are incorporated by reference in their entirety herein.

TECHNICAL FIELD

The present invention relates to wireless communications, and more specifically to a communication method and apparatus that support multicarrier.

BACKGROUND ART

The IEEE (Institute of Electrical and Electronics Engineers) 802.16e standard has been adopted back in 2007 as the sixth standard for IMT (International Mobile Telecommunication)-2000 by ITU-R (ITU-Radio communication sector) in the ITU (International Telecommunication Union).

IEEE 802.16 WG (Working Group) has determined late in 2006 to proceed with the IEEE 802.16m project to draft an amendment standard for the existing IEEE 802.16e as a standard for IMT-Advanced systems. As can be guessed from the target, the standard IEEE 802.16m includes two aspects; one past continuity as an amendment to IEEE 802.16e and one future continuity in terms of a standard for next generation IMT-Advanced systems. Accordingly, IEEE 802.16m is required to satisfy advanced requirements for IMP-Advanced systems while maintaining compatibility with mobile WiMax systems based on IEEE 802.16e.

Since IEEE 802.16m systems have backward compatibility, they may support terminals which support IEEE 802.16e systems as well as terminals which support IEEE 802.16m systems. When IEEE 802.16m systems support 802.16e terminals, it may be called legacy support mode.

There is a need of methods for more efficiently assigning radio resources in the legacy support mode.

DISCLOSURE

Technical Problem

The present invention provides a communication method and apparatus using multicarrier.

Technical Solution

In an aspect, a communication method using multicarrier is provided. The communication method includes activating a first carrier, activating a second carrier adjacent to the first carrier, and performing communication with a base station by using the first carrier and the second carrier. A first frame including a legacy uplink (UL) region and an Advanced Air Interface (AAI) UL region may be defined in the first carrier. A second frame including an AAI UL region may be defined in the second carrier. The legacy UL region and the AAI UL region may occupy different frequencies from each other. Guard subcarriers between the AAI UL region of the first carrier and the AAI UL region of the second carrier may not be used for data transmission.

A legacy resource assignment unit used for the legacy UL region of the first frame may be different from an AAI resource assignment unit used for the AAI UL region of the first frame.

The legacy resource assignment unit may include three Orthogonal Frequency Division Multiple Access (OFDMA) symbols, and the AAI resource assignment unit may include six OFDMA symbols.

The first frame may further include a legacy DL (Downlink) region and an AAI DL region, and the legacy DL region and the AAI DL region may occupy different time at the same frequency.

The second frame may further include an AAI DL region, and guard subcarriers between the first carrier and the second carrier may be used for data transmission in a region where the AAI DL region of the first frame and the AAI DL region of the second frame are overlapped in time domain.

The method may further include receiving information on whether to use the guard subcarriers from the base station.

The first carrier and the second carrier may have the same Cyclic Prefix (CP) length.

In another aspect, a communication apparatus using multicarrier is provided. The communication apparatus includes a radio frequency (RF) unit configured to transmit and receive a radio signal, and a processor connected to the RF unit and configured to activate a first carrier, activate a second carrier adjacent to the first carrier, and perform communication with a base station by using the first carrier and the second carrier. A first frame including a legacy uplink (UL) region and an Advanced Air Interface (AAI) UL region may be defined in the first carrier. A second frame including an AAI UL region may be defined in the second carrier. The legacy UL region and the AAI UL region may occupy different frequencies from each other. Guard subcarriers between the AAI UL region of the first carrier and the AAI UL region of the second carrier may not be used for data transmission.

Advantageous Effects

There is suggested a scheme for utilizing guard sub-carriers when UL PUSC is used in the legacy support mode.

MODE FOR INVENTION

The present invention may apply to various radio communication systems. In some embodiments, the present invention may apply to IEEE Institute of Electrical and Electronics Engineers) 802.16 standards.

Hereinafter, IEEE 802.16e is based on the IEEE 802.16-2009 standard released on May, 2009. IEEE 802.16m is based on IEEE 802.16m/D4 released on February, 2010. IEEE 802.16e-based systems are referred to as legacy systems. IEEE 802.16m-based systems are referred to as AAI (Advanced Air Interface) systems.

A radio communication system includes at least one mobile station (MS) and at least one base station (BS). The mobile station may be stationary or have mobility, and may be called other terms, such as UE (User Equipment), MT (Mobile Terminal), UT (User Terminal), SS (Subscriber Station), wireless device, PDA (Personal Digital Assistant), wireless model, or handheld device. The base station refers to a fixed station that communicates with the mobile station and may be called other terms, such as eNB (Evolved-Node B), BTS (Base Transceiver System), or access point.

IEEE 802.16m introduces multicarrier for supporting a broader bandwidth than IEEE 802.16e. Multicarrier transmission performs transmission and reception of data using plural carriers between the base station and mobile station.

The carrier may be called other terms, such as component carrier or cell. When the carrier corresponds to one cell, it may be said that the mobile station receives a service from plural serving cells.

Figure 1:
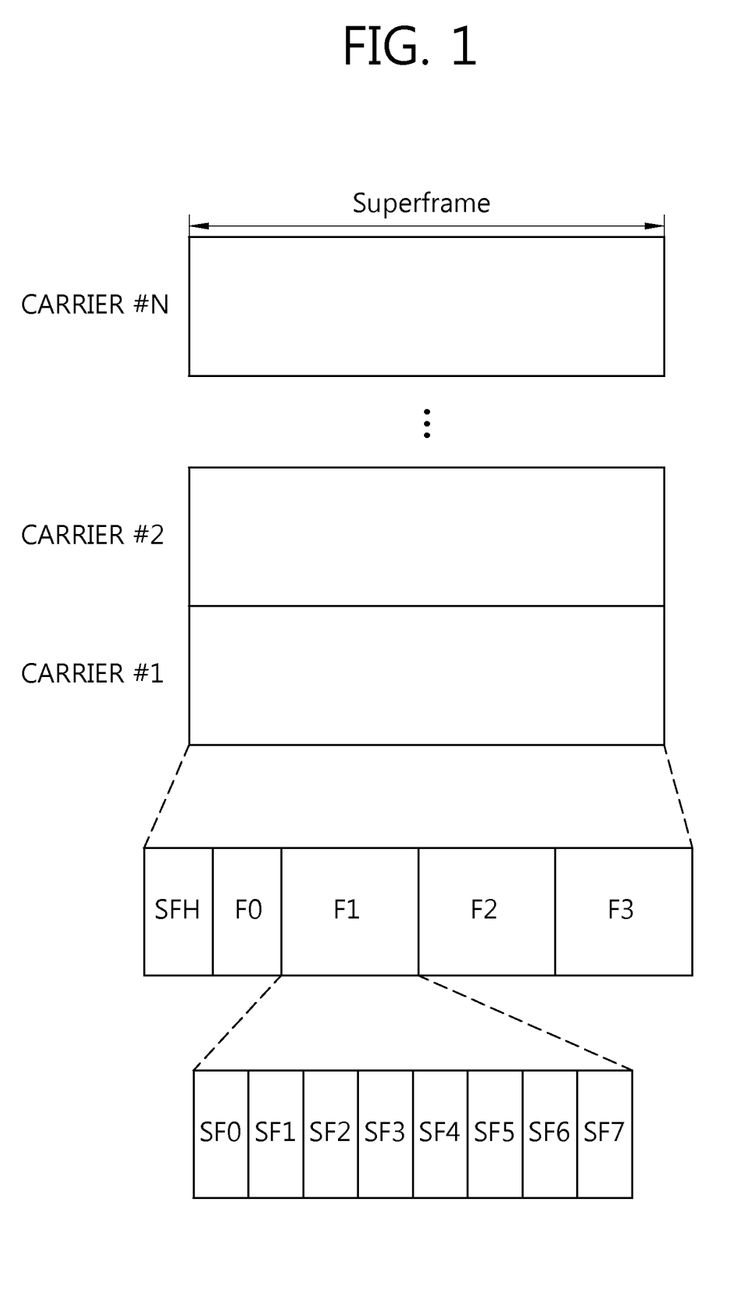
FIG. 1 illustrates a frame structure of supporting a multicarrier operation.

FIG. 1 illustrates a frame structure of supporting a multicarrier operation.

There are carriers #1 to #N (N>1), and each carrier constitutes its own superframe.

The superframe includes four frames F0, F1, F2, and F3. According to the IEEE 802.16m/D4 standard, the length of the superframe is 20 ms, and the length of each frame is 5 ms.

One frame includes eight subframes SF0, SF1, SF2, SF3, SF4, SF5, SF6, and SF7. Each subframe may be a UL (uplink) subframe or a DL (downlink) subframe. According to the bandwidth and the length of CP (Cyclic Prefix), the number of subframes included in the frame may vary.

One subframe includes plural OFDMA (Orthogonal Frequency Division Multiple Access) symbols in the time domain and includes plural subcarriers in the frequency domain. According to the number of the OFDMA symbols included in the subframe, the type of the subframe may be defined. For example, type-1 subframe may be defined to include 6 OFDMA symbols, type-2 subframe 7 OFDMA symbols, type-3 subframe 5 OFDMA symbols, and type-4 subframe 9 OFDMA symbols. One frame may include the subframes of the same type. Or, one frame may include subframe of different types.

IEEE 802.16m supports a TDD (Time Division Duplex) mode and an FDD (Frequency Division Duplex) mode. In the TDD mode, UL subframe and DL subframe are transmitted at different times at the same frequency. In the FDD mode, UL subframe and DL subframe may be transmitted at the same time at different frequencies.

SFH (Super Frame Header) is transmitted over the first subframe of the first frame F0 of the super frame. SFH may carry an essential system parameter and system configuration information. SFH may include P-SFH (primary-SFH) and S-SFH (secondary-SFH). S-SFH may be divided into three subpackets including S-SFH SP1, S-SFH SP2, and S-SFH SP3. Each subpacket may be periodically transmitted at a different period. Information transmitted through S-SFH SP1, S-SFH SP2, and S-SFH SP3 may be different from each other, and S-SFH SP1 may be transmitted at the shortest period and S-SFH SP3 may be transmitted at the longest period. S-SFH SP1 includes information on network re-entry. S-SFH SP2 includes information on initial network entry and network discovery. S-SFH SP3 includes remaining critical system information.

A PRU (Physical Resource Unit) is a basic physical unit for resource assignment, and includes 18 consecutive subcarriers and Nsym consecutive OFDMA symbols. Nsym may be determined according to the type of the subframe. For example, when one subframe consists of six OFDMA symbols, Nsym is 6.

An LRU (Logical Resource Unit) is a basic logical unit for distributed and consecutive resource assignment.

A DLRU (Distributed Logical Resource Unit) may be used for obtaining a frequency diversity gain. The DLRU includes a subcarrier group distributed in one frequency partition. A minimum assigned unit constituting the UL DLRU is referred to as a tile. The UL DLRU may include the subcarrier group from three distributed tiles. The tile may be defined as six subcarriers and Nsym OFDMA symbols.

A CLRU (Contiguous Logical Resource Unit) may be used for obtaining a frequency-selective scheduling gain. The CLRU includes a consecutive subcarrier group in a locally assigned resource. The CLRU is constituted of a data subcarrier in a CRU (Contiguous Resource Unit). The size of the CRU is the same as the size of the PRU.

When plural cells are present, the UL resource may be mapped via subband partitioning, miniband permutation, and frequency partitioning.

Figure 2:
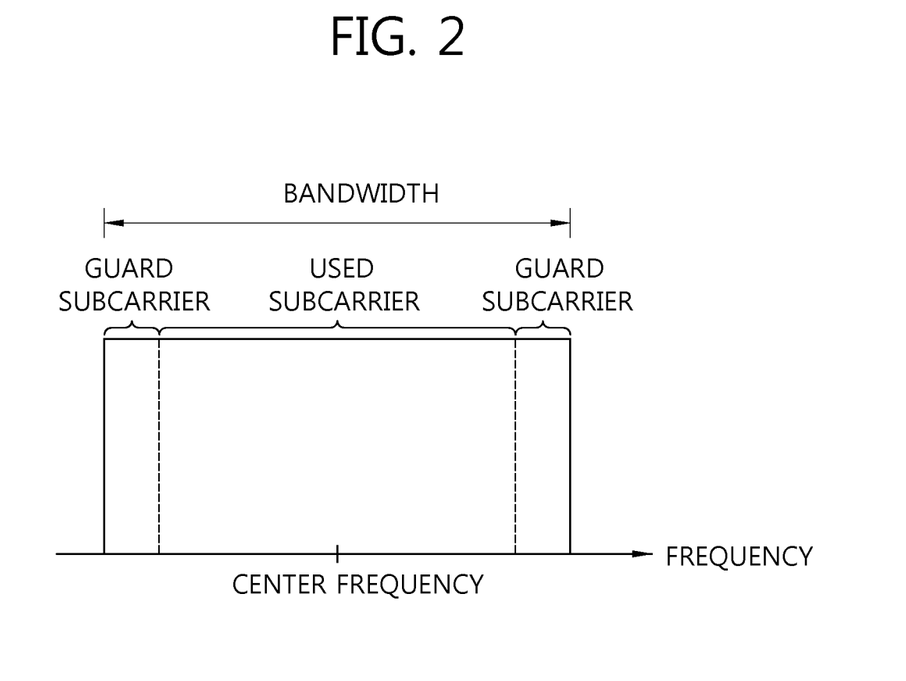
FIG. 2 is a conceptual view illustrating a carrier.

FIG. 2 is a conceptual view illustrating a carrier. In the frequency domain, the carrier is defined by a center frequency and bandwidth. The band of the carrier includes a used subcarrier and guard subcarriers at both sides thereof. The used subcarrier is used for data transmission. The guard subcarriers are used to mitigate interference between the carriers.

The band used by the used subcarrier is called 'used band', and the bands used by the guard subcarriers are called 'guard bands'.

The following table shows a configuration of the guard subcarrier between AAI and legacy.

TABLE 1

|  |  | 5 MHz (512 FFT) | 10 MHz (1024 FFT) | 20 MHz (2048 FFT) |
|---|---|---|---|---|
| AAI | No. of PRUs | 24 | 48 | 96 |
|  | No. of used subcarriers | 433 | 865 | 1729 |
|  | No. of guard subcarriers | (40, 39) | (80, 79) | (160, 159) |
|  | No. of guard PRUs | 0 | 1 | 2 |
| legacy | No. of PRUs | 17 | 35 | 70 |
|  | No. of used subcarriers | 409 | 841 | 1681 |
|  | No. of guard subcarriers | (52, 51) | (92, 91) | (184, 183) |

The base station notifies the mobile station of the start point and number of the LRUs. According to the above table 1, it can be seen that the number of PRUs in the AAI system is always larger than the number of PRUs in the legacy system.

Carriers may be contiguous to each other or may be non-contiguous. When two carriers are contiguous to each other, the center frequencies of the two carriers are spaced apart from each other by the bandwidths of the carriers.

Figure 3:
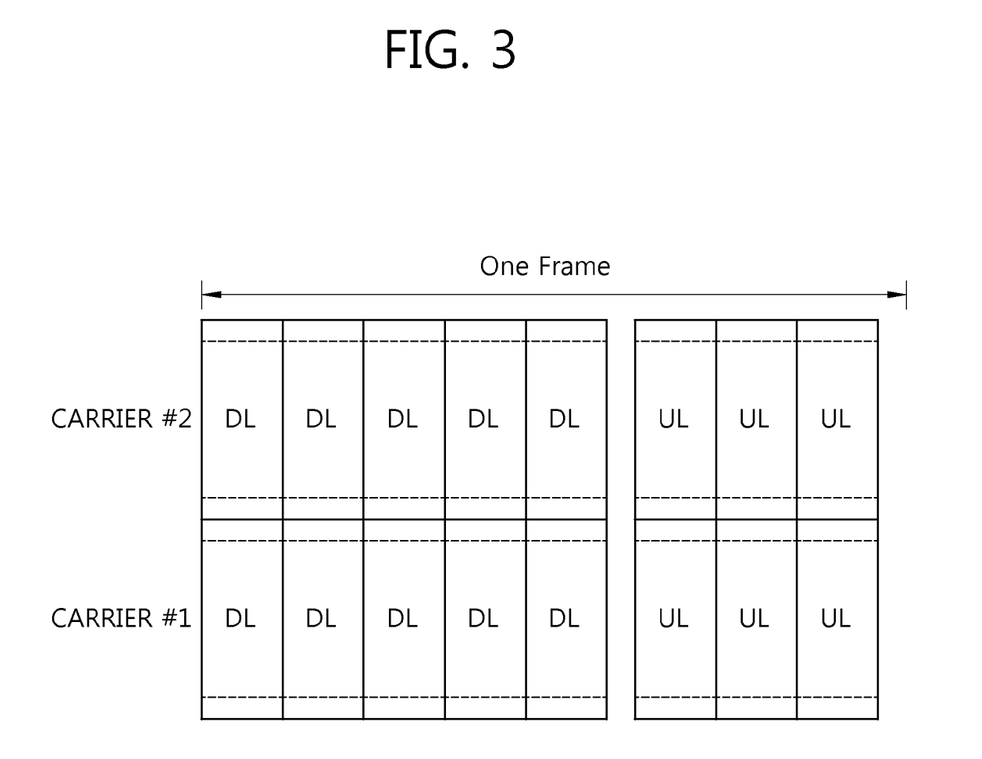
FIG. 3 illustrates two carriers adjacent to each other.

FIG. 3 illustrates two carriers contiguous to each other. Carrier #1 is contiguous to carrier #2, and interval between the center frequencies is a multiple of subcarrier spacing.

When contiguous carriers are involved in each other in a multicarrier operation, guard subcarriers between adjacent frequency channels may be used for data transmission.

Figure 9:
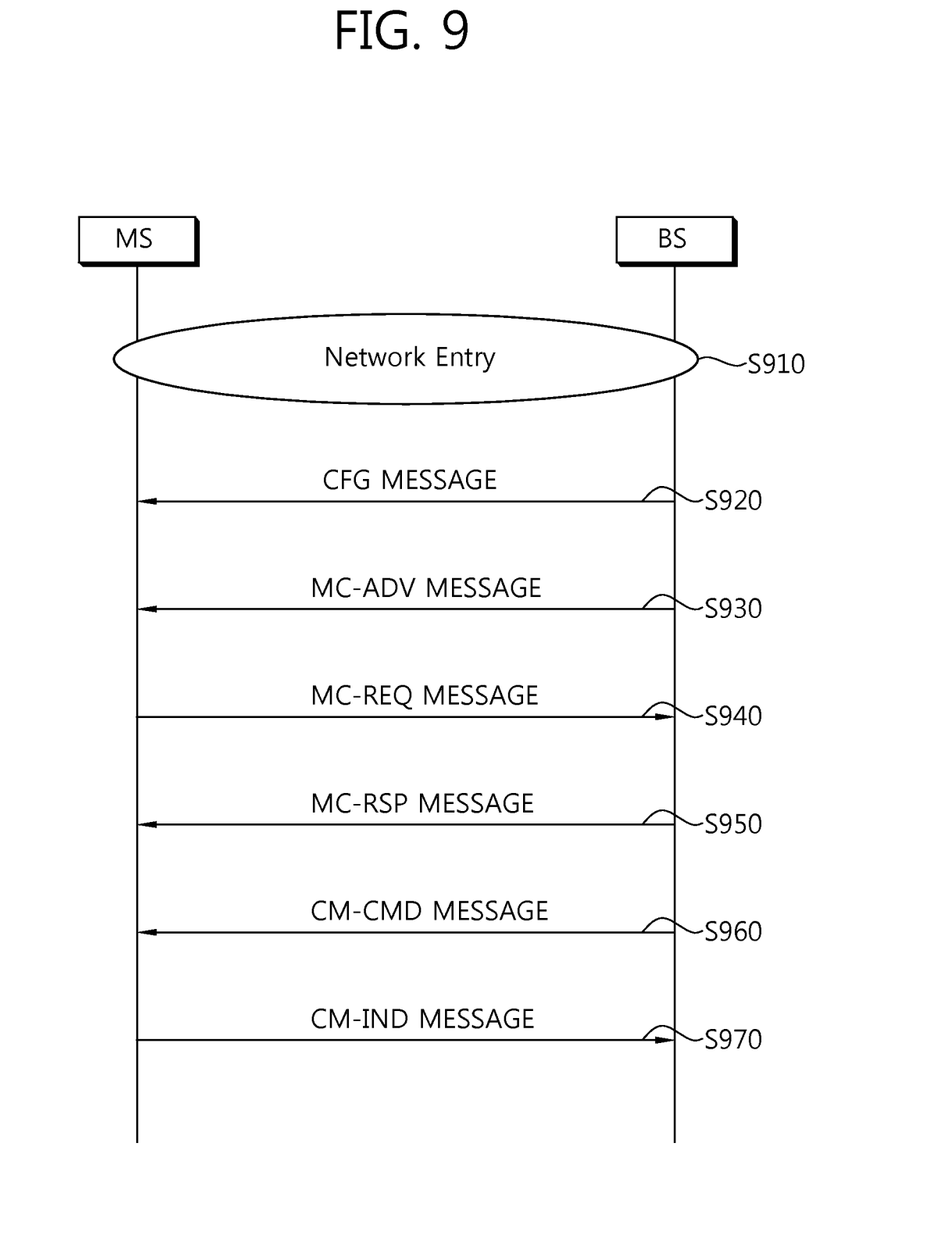
FIG. 9 illustrates an example of a multicarrier operation.

The base station may notify whether to use the guard subcarriers through a guard indicator in an MC-RSP (Multicarrier Response) shown in FIG. 9.

Meanwhile, IEEE 802.16m supports the legacy support mode. The legacy support mode represents that an IEEE 802.16m system operates compatible with a legacy system.

Figure 4:
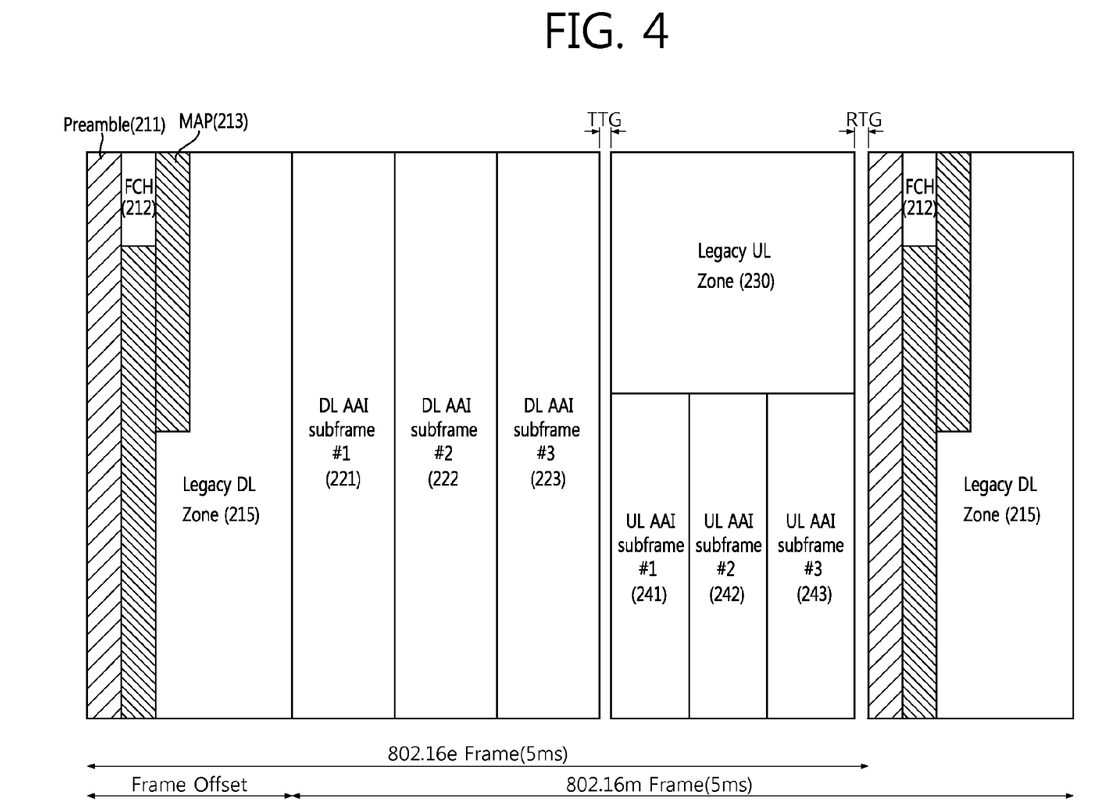
FIG. 4 illustrates a frame structure for a legacy support mode.

FIG. 4 illustrates a frame structure for a legacy support mode.

A legacy frame and an AAI frame have an offset as large as a frame offset.

A DL region includes a legacy DL region 215 and an AAI DL region. The frame includes a preamble 211, an FCH (Frame Control Header) 212, an MAP 213, a legacy DL region 215, and an AAI DL region. The preamble 211 is used for initial synchronization, cell searching, frequency offset, and channel estimation between the base station and the mobile station. The FCH 212 includes the length of DL-MAP message and information on the coding scheme of the DL-MAP. The MAP 213 is a region over which DL-MAP message and/or UL-MAP message are transmitted. The DL-MAP message defines access to a down link channel.

The AAI DL region includes three DL AAI subframes 221, 222, and 223, but the number of the included DL AAI subframes is not limited thereto. The legacy DL region 215 and the AAI DL region are transmitted at different times and thus remain TDMed.

TTG (Transmit/Receive Transition Gap) is a gap between the DL region and a subsequent UL region. RTG (Receive/Transmit Transition Gap) is a gap between the UL region and a subsequent DL region.

In the legacy support mode, UL PUSC (Partially Used Subcarrier) permutation is supported. The AAI UL region includes three UL AAI subframes 241, 22, and 243 but the number of the included UL AAI subframes is not limited thereto. The legacy UL region 230 and the AAI DL region are transmitted over different subcarriers at the same time, and thus, remain FDMed.

In the UL FDM mode, a subcarrier group including plural subcarriers, i.e., subchannel, is assigned to one or more legacy UL regions 230. Other subchannels including the remaining plural subcarriers are assigned to the AAI UL region. In the case that the bandwidth is one of 5, 7, 10, or 20 MHz, all the UL AAI subframes become type-1 subframes. That is, they include six OFDMA symbols. When the bandwidth is 8.75 MHz, the first UL subframe becomes type-1 subframe, and the remaining UL subframes become type-4 subframes.

Figure 5:
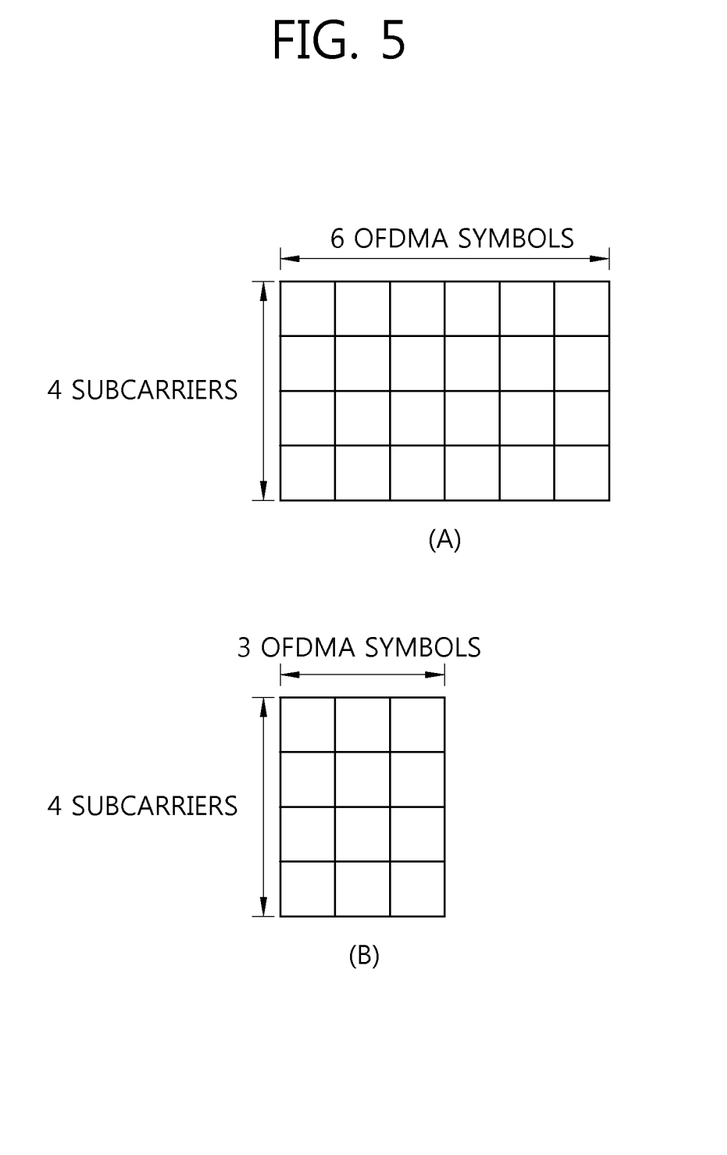
FIG. 5 illustrates a structure of a tile used in a legacy support mode.

FIG. 5 illustrates a structure of a tile used in the legacy support mode. FIG. 5(A) illustrates an AAI tile used in the AAI UL region, and FIG. 5(B) illustrates a legacy tile used in the legacy UL region.

The AAI tile includes four consecutive subcarriers and six OFDMA symbols. In the legacy support mode, the DLRU of the AAI UL region is constituted of six AAI tiles. In comparison, the legacy tile consists of four consecutive subcarriers and three OFDMA symbols. In the legacy region, the subchannel consists of six distributed tiles. The position of the subchannel in the frequency domain is determined according to the permutation rule of the legacy system.

The legacy support mode may also apply to a multicarrier operation. Among plural carriers, one carrier is applied with the legacy support mode, and the other carriers are applied with the AAI subframes.

In the legacy support mode, both the legacy system and AAI system use the PUSC permutation of the legacy system. That is, the AAI system configures the LDRU based on permutation and the number of subchannels defined in IEEE 802.16e.

However, when the carrier using the legacy support mode (this is referred to as "legacy support carrier") is adjacent to the carrier using AAI (this is referred to as "AAI carrier"), it is not disclosed how the guard carriers between the two carriers are to be utilized.

Figure 6:
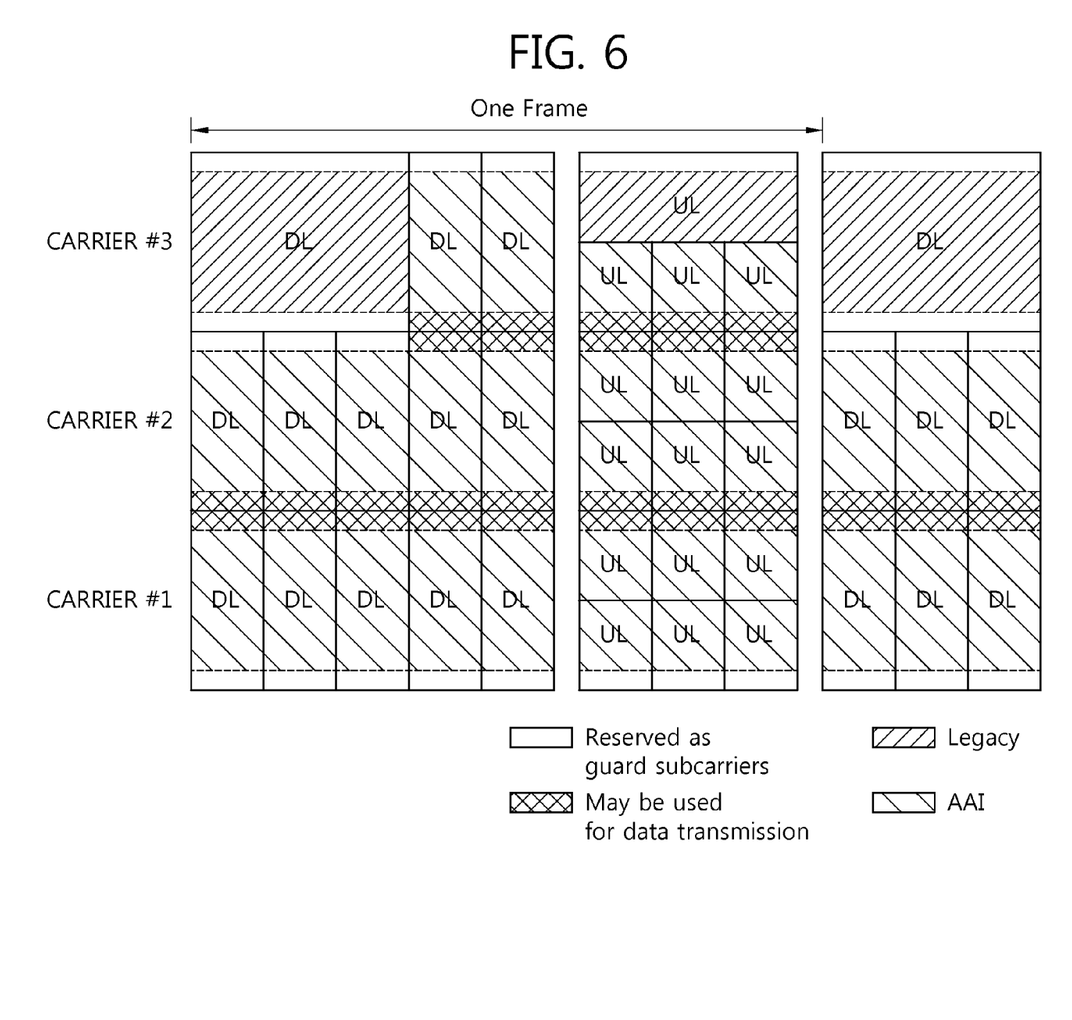
FIG. 6 illustrates a frame structure according to an embodiment of the present invention.

FIG. 6 illustrates a frame structure according to an embodiment of the present invention.

Carrier #1 and carrier #2 are adjacent to each other, are AAI carriers to support AAI. Accordingly, guard subcarriers between carrier #1 and carrier #2 may be used for data transmission.

Carrier #2 and carrier #3 are adjacent to each other, and carrier #3 is a legacy support carrier that supports the legacy support mode. For carrier #2 and carrier #3, UL support settings (TDM or FDM), DL/UL ratio, and CP length are the same.

The guard subcarriers of carriers #2 and #3 to which UL PUSC FDM applies may be used for data transmission as well. However, the guard subcarriers of carrier #2 and the DL region used by the legacy system in carrier #3 are not used.

To use the guard subcarriers for data transmission, PRU (this is referred to as "guard PRU") may be generated using the guard subcarriers. This guard PRU is divided on a per-tile basis, and then, may be subjected to permutation together with the tiles applied with legacy PUSC. There are advantages that the guard subcarriers may be utilized and the guard PRU may be used to fit for the purpose that it is PUSC for obtaining frequency diversity.

According to another embodiment, the guard PRU may be generated only with the guard subcarriers. A new CRU may be used which is constituted of 24 consecutive subcarriers by using plural adjacent tiles consisting of the guard PRUs. Or, when the guard PRUs are two or more, non-adjacent tiles may be tied to configure a new DRU. For example, even-number-indexed tiles may be allocated to a first guard PRU, and odd-number-indexed tiles may be allocated to a second guard PRU.

It can be notified by using the resource index whether the allocated PRU is a guard PRU. As shown in table 1, the number o PRUs in the AAI frame is always larger than the number of PRUs in the legacy frame. Accordingly, the guard subcarrier is used for legacy frame, so that the index of the used guard PRU is more than the number of PRUs supported by the legacy frame. For example, assume that a legacy frame having a bandwidth of 5 MHz has 17 PRUs, and the 17 PURs have indexes of 0 to 16. The index of the guard PRU may have a number equal to or larger than 17. Accordingly, when the index of the assigned PRU is 17, the mobile station may be aware of being using the guard PRU.

If the existing UL control channels are assigned to only the PRU of the used carriers as in the conventional art, it is not affected by presence or absence of the guard PRU. Upon first access, the mobile station is not aware of whether to use the guard PRU and may receive the UL control channels.

In another embodiment, in the UL PUSC FDM support mode, the guard subcarriers may be mapped with the AAI carrier and used.

Assume that a specific carrier is a legacy support carrier using the legacy support mode. Legacy support carriers are difficult to apply with a subcarrier offset so as to perform alignment between the carriers. This is because if the legacy mobile station using the legacy support carrier scans the legacy support carrier while maintaining raster, the legacy mobile station may be influenced by the offset of the subcarrier.

If the carrier adjacent to the legacy support carrier is an AAI carrier, an alignment of the legacy support carrier and the subcarrier may be maintained by applying the subcarrier offset. Accordingly, the guard subcarrier of the legacy support carrier may be used.

The guard subcarrier that may be used may be assigned to the mobile station operating in the legacy support mode.

Indexing or permutation may apply to the AAI carrier so that the guard subcarrier of the legacy support carrier may be used. For example, if a subcarrier alignment applies in the AAI carrier adjacent to the legacy support carrier, the guard PRU of the legacy support carrier is mapped with the PRU index of the AAI carrier. The index of the guard PRU is additionally defined in the available PRU index of the AAI carrier. Assume that the AAI frame of the AAI carrier has 17 PRUs and the 17 PRUs have indexes of 0 to 16. One guard PRU of the adjacent legacy support carrier may have an index of 1. Since the mobile station is aware that the carrier adjacent to the AAI carrier is a legacy support carrier, when receiving PRU index 17 from the AAI carrier, it may be aware that the guard PRU is used.

The base station may notify the mobile station of whether to use the guard subcarrier.

The guard subcarrier may be divided into a left guard subcarrier and a right guard subcarrier. A left guard PRU and a right guard PRU may be respectively assigned thereto. When a carrier adjacent to the left guard subcarrier is carrier 1, and a carrier adjacent to the right guard subcarrier is carrier 2, the left guard PRU is assigned through carrier 1, and the right guard PRU is assigned through carrier 2.

Figure 7:
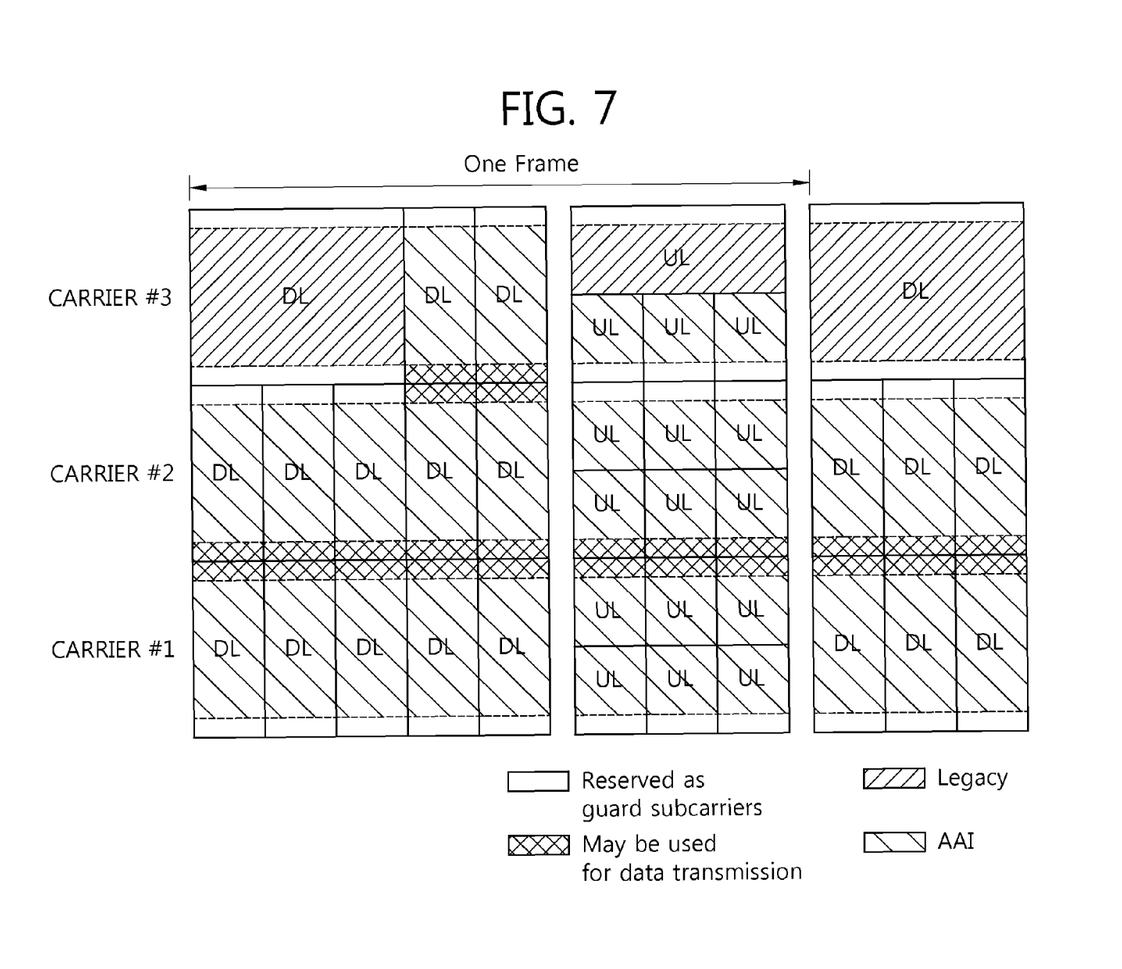
FIG. 7 illustrates a frame structure according to another embodiment of the present invention.

FIG. 7 illustrates a frame structure according to another embodiment of the present invention. Carrier #1 is adjacent to carrier #2, and is an AAI carrier that supports AAI. Accordingly, the guard subcarriers between carrier #1 and carrier #2 may be used for data transmission.

Carrier #2 and carrier #3 are adjacent to each other, and carrier #3 is a legacy support carrier that supports the legacy support mode. For carrier #2 and carrier #3, UL support settings (TDM or FDM), DL/UL ratio, and CP length are the same.

The guard subcarriers between carrier #2 and the DL region used by the legacy system in carrier #3 are not used. In the DL region belonging to the DL AAI subframe, the guard subcarriers of carrier #3 and carrier #2 are used for data transmission.

In comparison with the embodiment illustrated in FIG. 6, the guard subcarriers of carrier #2 and carrier #3 in the UL region to which UL PUSC FDM applies are not used for data transmission.

PUSC subchannels are constituted using six distributed tiles among tiles each consisting of four subcarriers. However, since the guard subcarriers are adjacent to each other, they cannot be distributed without performing permutation. Since the structure of the legacy system cannot be changed, PUSC permutation needs to be maintained. Accordingly, rather than defining new permutation for using the guard subcarrier, it may be more simple not to use the guard subcarriers.

Hereinafter, a multicarrier operation using the frame structure shown in FIGS. 6 and 7 is described.

The carrier may be divided into a primary carrier and a secondary carrier. The primary carrier is a carrier through which the mobile station has finished an initial network entry process or network reentry process. Only one primary carrier is present, and a message associated with the multicarrier operation is transmitted to the mobile station through the primary carrier. The second carrier is an additional carrier that the base station assigns to the mobile station.

Figure 8:
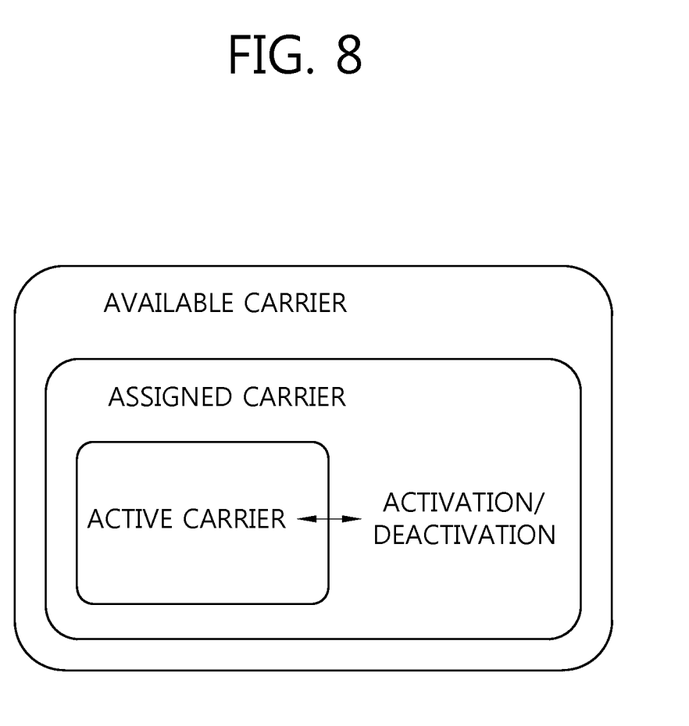
FIG. 8 illustrates a multicarrier management model.

FIG. 8 illustrates a multicarrier management model.

The available carrier refers to all the carriers supported by the base station.

The assigned carrier refers to a carrier to which the base station assigned to the mobile station according to capability of the mobile station. A subset of the available carriers becomes the assigned carrier.

The active carrier refers to a carrier activated among the assigned carriers and is used for data transmission between the mobile station and the base station.

FIG. 9 illustrates an example of a multicarrier operation. Messages may be exchanged through the primary carrier.

The mobile station, together with the base station, finishes the network entry process (S910).

The base station transmits a CFG (Carrier Configuration) message to the mobile station (S920). The CFG message includes carrier information on all the available carriers over the network. The carrier information includes the number of available carriers, the center frequency of each available carrier, and carrier index of each available carrier. The carrier index is used for identifying each carrier in the following messages.

The base station transmits an MC-ADV (Multicarrier Advertisement) message to the mobile station (S930). The MC-ADV message is periodically broadcast to all the mobile stations. The MC-ADV message includes basic radio configuration information of the available carriers. The basic radio configuration information uses the carrier index defined in the CFG message. A basic radio setting is given to the available carrier identified by the carrier index.

The mobile station transmits an MC-REQ (Multicarrier Request) message to the base station (S940). The MC-REQ message is used for requesting a list of assigned carriers. The mobile station, after receiving the CFG message and the MC-ADV message, may transmit the MC-REQ message. According to the basic radio configuration information in the MC-ADV message, the mobile station may determine a set of carriers that may be processed at the same time under its hardware capability. The mobile station includes the determined candidate assigned carrier set in the MC-REQ message as a set of carrier indexes.

The base station transmits an MC-RSP (Multicarrier Response) message in response to the MC-REQ message (S950). Based on the information in the MC-REQ message, the base station transmits information on the assigned carrier to the mobile station through the MC-RSP message. The MC-RSP message may include a direction indicator and guard indicator, and carrier index of the assigned carrier. The direction indicator indicates whether the assigned carrier is assigned to both DL and UL or only one of DL and UL. The guard indicator indicates whether data transmission is supported using guard subcarriers between two adjacent carriers.

The MC-RSP message may be transmitted to update the list of carriers assigned by the base station without receiving the MC-REQ message.

The base station transmits a CM-CMD (Carrier Management Command) message to the mobile station (S960). The CM-CMD message is used for activation/inactivation of the carrier or changing the primary carrier. The CM-CMD message includes a list of activated carriers and a list of inactivated carriers.

The mobile station transmits a CM-IND (Carrier Management Indication) message to the base station (S970). The CM-IND message is used for the mobile station to notify successful activation of a target carrier newly activated or successful change of the primary carrier through the CM-CMD message.

The base station and the mobile station communicate with each other through the frame structure shown in FIGS. 6 and 7 in the activated carrier.

Figure 10:
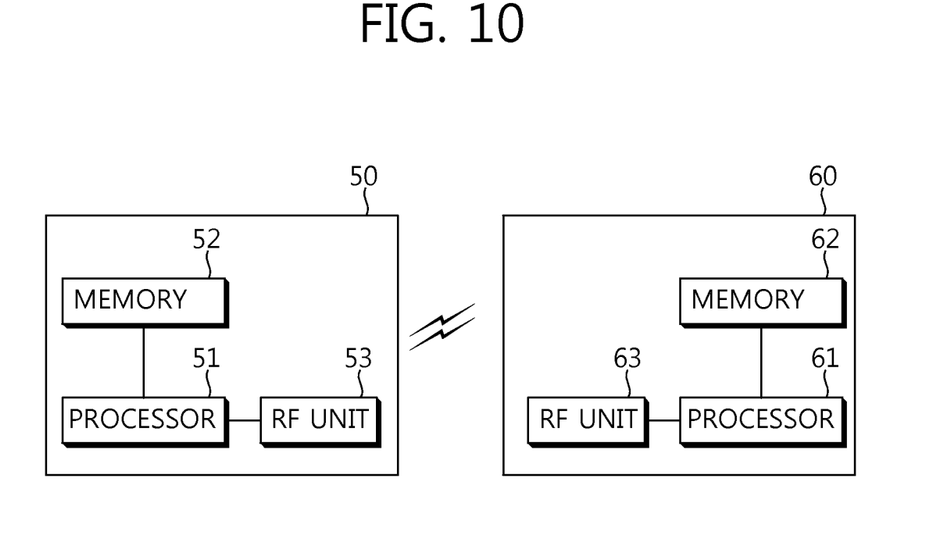
FIG. 10 is a block diagram illustrating a radio communication system according to an embodiment of the present invention.

FIG. 10 is a block diagram illustrating a radio communication system where an embodiment of the present invention is implemented.

A base station 50 includes a processor 51, a memory 52, and an RF (Radio Frequency) unit 53. The memory 52 is connected to the processor 51 and stores various types of information to drive the processor 51. The RF unit 53 is connected to the processor 51 and transmits and/or receives a radio signal. The processor 51 implements the suggested functions, processes, and/or methods. The operation of the base station according to the embodiments described in connection with FIGS. 6, 7, and 9 may be implemented by the processor 51.

A mobile station 60 includes a processor 61, a memory 62, and an RF unit 63. The memory 62 is connected to the processor 61 and stores various types of information to drive the processor 61. The RF unit 63 is connected to the processor 61 and transmits/receives a radio signal. The processor 61 implements the suggested functions, processes, and/or methods. The operation of the mobile station according to the embodiments described in connection with FIGS. 6, 7, and 9 may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A communication method using multicarrier, the communication method comprising:
    activating a first carrier;
    activating a second carrier adjacent to the first carrier; and
    performing communication with a base station using the first carrier and the second carrier,
    wherein a first frame including a legacy uplink (UL) region and an Advanced Air Interface (AAI) UL region is defined in the first carrier,
    wherein a second frame including an AAI UL region is defined in the second carrier,
    wherein the legacy UL region and the AAI UL region occupy different frequencies from each other,
    wherein guard subcarriers between the AAI UL region of the first carrier and the AAI UL region of the second carrier are not used for data transmission,
    wherein the first frame further includes a legacy DL (Downlink) region and an AAI DL region, and the legacy DL region and the AAI DL region occupy different times at the same frequency, and
    wherein the second frame further includes an AAI DL region, and guard subcarriers between the first carrier and the second carrier are used for data transmission in a region where the AAI DL region of the first frame and the AAI DL region of the second frame overlap in the time domain.

2. The communication method of claim 1, wherein a legacy resource assignment unit used for the legacy UL region of the first frame is different from an AAI resource assignment unit used for the AAI UL region of the first frame.

3. The communication method of claim 2, wherein the legacy resource assignment unit includes three Orthogonal Frequency Division Multiple Access (OFDMA) symbols, and the AAI resource assignment unit includes six OFDMA symbols.

4. The communication method of claim 1, further comprising:
    receiving information on whether to use the guard subcarriers from the base station.

5. The communication method of claim 1, wherein the first carrier and the second carrier have the same Cyclic Prefix (CP) length.

6. A communication apparatus using multicarrier, the communication apparatus comprising:
    a radio frequency (RF) unit configured to transmit and receive a radio signal; and
    a processor connected to the RF unit and configured to:
    activate a first carrier;
    activate a second carrier adjacent to the first carrier; and
    perform communication with a base station using the first carrier and the second carrier,
    wherein a first frame including a legacy uplink (UL) region and an Advanced Air Interface (AAI) UL region is defined in the first carrier,
    wherein a second frame including an AAI UL region is defined in the second carrier,
    wherein the legacy UL region and the AAI UL region occupy different frequencies from each other,
    wherein guard subcarriers between the AAI UL region of the first carrier and the AAI UL region of the second carrier are not used for data transmission,
    wherein the first frame further includes a legacy DL (Downlink) region and an AAI DL region, and the legacy DL region and the AAI DL region occupy different times at the same frequency, and
    wherein the second frame further includes an AAI DL region, and guard subcarriers between the first carrier and the second carrier are used for data transmission in a region where the AAI DL region of the first frame and the AAI DL region of the second frame overlap in the time domain.

7. The communication apparatus of claim 6, wherein a legacy resource assignment unit used for the legacy UL region is different from an AAI resource assignment unit used for the AAI UL region.

8. The communication apparatus of claim 7, wherein the legacy resource assignment unit includes three Orthogonal Frequency Division Multiple Access (OFDMA) symbols, and the AAI resource assignment unit includes six OFDMA symbols.

9. The communication apparatus of claim 6, wherein the processor is configured to receive information on whether to use the guard subcarriers from the base station.

10. The communication apparatus of claim 6, wherein the first carrier and the second carrier have the same Cyclic Prefix (CP) length.

\* \* \* \* \*